United States Patent [19]

Schilling

[11] Patent Number: 4,859,362
[45] Date of Patent: Aug. 22, 1989

[54] SULFOMETHYLATED LIGNIN AMINES

[75] Inventor: Peter Schilling, Charleston, S.C.

[73] Assignee: Westvaco Corporation, New York, N.Y.

[21] Appl. No.: 45,894

[22] Filed: May 4, 1987

Related U.S. Application Data

[63] Continuation-in-part of Ser. No. 762,215, Aug. 5, 1985, which is a continuation-in-part of Ser. No. 889,236, Jul. 25, 1986, abandoned.

[51] Int. Cl.$^4$ ............................................. B01J 13/00
[52] U.S. Cl. .................................. 252/312; 252/356; 252/8.513; 106/277
[58] Field of Search .................... 252/312, 356, 8.513; 106/277

[56] References Cited

U.S. PATENT DOCUMENTS

| | | | |
|---|---|---|---|
| 2,120,557 | 6/1938 | Haussmann | 260/124 |
| 2,379,890 | 7/1945 | Dorland et al. | 106/163 |
| 2,483,797 | 10/1949 | Van Valkenburgh | 260/97.5 |
| 2,744,888 | 5/1956 | Carnes et al. | 260/97.5 |
| 2,839,417 | 6/1958 | Tousignant et al. | 106/123 |
| 3,047,509 | 7/1962 | Absbury et al. | 252/117 |
| 3,438,960 | 4/1969 | Kim | 260/124 |
| 3,492,228 | 1/1970 | Kim | 252/8.5 |
| 4,455,257 | 6/1984 | Hoftiezer et al. | 260/124 R |
| 4,478,642 | 10/1984 | Schiling et al. | 106/277 |
| 4,494,992 | 1/1985 | Schilling et al. | 106/277 |
| 4,561,901 | 12/1985 | Schilling | 106/277 |
| 4,562,236 | 12/1985 | Lin | 527/400 |
| 4,658,036 | 4/1987 | Schilling | 548/513 |
| 4,705,682 | 11/1987 | Moeller et al. | 252/356 |
| 4,732,576 | 3/1988 | Friedrich et al. | 252/357 |
| 4,757,833 | 7/1988 | Danley | 252/312 |

FOREIGN PATENT DOCUMENTS 571474 1/1976 Switzerland .

Primary Examiner—Matthew A. Thexton
Assistant Examiner—Catherine S. Kilby Scalzo
Attorney, Agent, or Firm—Terry B. McDaniel; Richard L. Schmalz

[57] ABSTRACT

Surface active agents are prepared from by-products of papermaking. According to this method, lignin, modified lignin, and mixtures thereof are reacted with a polyamine to produce an amine condensate, and this amine condensate is reacted with a bisulfite and formaldehyde in aqueous solution to produce the novel surface active agents.

14 Claims, No Drawings

SULFOMETHYLATED LIGNIN AMINES

This application is a continuation-in-part of application Ser. No. 762,215, filed on Aug. 5, 1985, which application is a continuation-in-part of application Ser. No. 889,236, filed July 25, 1986, now abandoned.

BACKGROUND OF THE INVENTION

The present invention relates to the field of surface active agents produced from by-products of papermaking.

Most aldehydes are known to react with sodium bisulfite in aqueous solution to produce an aldehyde-bisulfide complex according to reaction (I) as follows:

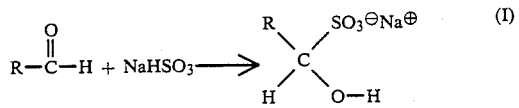

The aldehyde bisulfite complex is known to react with primary and secondary amines, to form disulfonates and sulfonates, according to the following reactions (II) and (III):

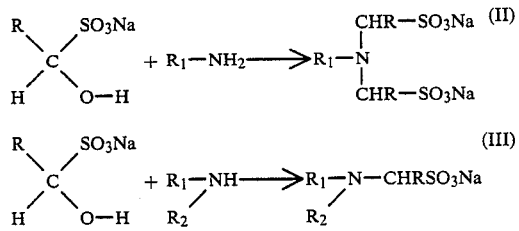

In the above reactions, R is generally hydrogen, short chain alkyl- or aryl-, and $R_1$, $R_2$ are generally alkyl-, aryl-cycloalkyl-, alkenyl-, benzyl-, or hydroxyethyl-, or sulfoethyl-.

Amides are also known to react with the aldehyde bisulfite complex. Sulfomethylated long chain ($C_{12}$–$C_{19}$) amides are known as detergents and have been manufactured in Germany under such trademarks as ODA IGEPON, HO 1/81, and LUWIPAL R. These materials are prepared by reacting a solid fatty amide with the addition product of sodium bisulfite and formaldehyde at 210° C., according to reaction (IV):

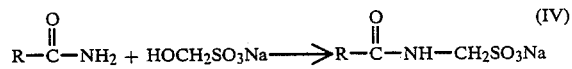

A representative discussion of the preparation of such materials is given in U.S. Pat. No. 3,047,509.

Sulfomethylation products of stearic acid - triethylene tetramine condensates are disclosed in Swiss Pat. No. 571,474. These products are described as dying assistants, fat-liquoring agents for leather, plasticizers and antistatic agents for paper.

It was earlier reported (U.S. Pat. No. 4,561,901) that the reaction product of polyamines and certain polycarboxylic acid anhydrides, when subsequently sulfomethylated with formaldehyde and bisulfite, can be employed as amphoteric emulsifiers for anionic and cationic bituminous emulsions. The polycarboxylic acid anhydrides are first formed by reacting maleic anhydride with oleic acid, elaidic acid, or conjugated or non-conjugated linoleic acid.

It also was reported (U.S. Pat. Nos. 4,494,992 and 4,478,642) that the reaction product of polyamines and certain polycarboxylic acids and sulfonated carboxylic acids, when subsequently sulfomethylated with formaldehyde and bisulfite, can be employed as amphoteric emulsifiers for anionic and cationic bituminous emulsions. The certain polycarboxylic acids are the $C_{19}$- and $C_{21}$-dicarboxylic acids and $C_{22}$-tricarboxylic acid formed by reacting oleic acid, elaidic acid, and conjugated linoleic acid with acrylic acid, methacrylic acid, fumaric acid or maleic acid.

SUMMARY OF THE INVENTION

It has now been found that reaction products of polyamines with kraft lignins, and reaction products of polyamines with tall oil based fatty acids can be sulfomethylated with sodium bisulfite (or sodium sulfite) formaldehyde in a temperature range between 20° and 90° C., to produce useful surface active materials.

Kraft lignins are natural aromatic organic polymers which are by-products from the production of paper. Lignins, as recovered from papermaking or in modified form, can be reacted under non-aqueous conditions with polyamines to form amidoamines, imidazolines, imidazolidines and imines, or they can be reacted in aqueous media with formaldehyde or other suitable aldehydes and polyalkyleneamines and as described in U.S. Pat. No. 4,455,257 (Mannich Reaction). These structures can be sulfomethylated with sodium bisulfite-formaldehyde.

Tall oil products, also by-products of papermaking, useful according to the method of the present invention include rosin (resin acids), monomeric acids, dimer acids, and reaction products of resin acids with acrylic acid, methacrylic acid, fumaric acid, or maleic anhydride.

DETAILED DESCRIPTION OF THE INVENTION

During the pulping process, lignin is solubilized by the pulping liquors and is separated from the fibers (cellulose) by filtration. Kraft lignin contributes about 30% of the solid matter in spent black liquor and is isolated by acidification (causing the lignin salt to precipitate) and filtration. Kraft lignin is non-homogeneous concerning chemical functionality and molecular distribution and is a dark polymeric material which contains mainly quaiacyl (hydroxy methoxy aryl) moieties which are linked via aliphatic side chains.

In addition to this reactive structure, carboxyl and carbonyl groups can be found. The number of these reactive groups can be increased, and the lignin modified, by oxidation of lignin, by its reaction with maleic anhydride or fumaric acid via the Diels-Alder reaction, or by reaction of the phenolic hydroxyls with chloracetic acid under alkaline reaction conditions.

Under non-aqueous reaction conditions, lignin carboxylic groups will react with polyalkyleneamines such as diethylenetriamine (DETA) to yield amidoamines (V, Va) and imidazolines (VI) by the following reactive routes:

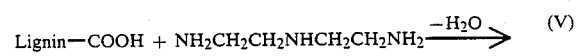

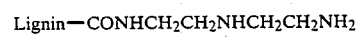

-continued

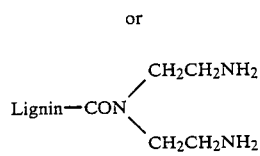
(Va)

or

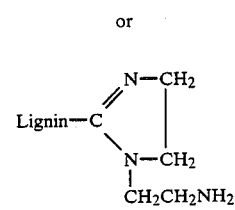
(VI)

The lignin carbonyl groups will react with DETA to yield imines (Schiff's Bases) or (VII) or imidazolidines (VIII).

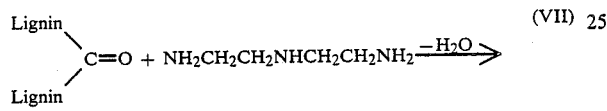
(VII)

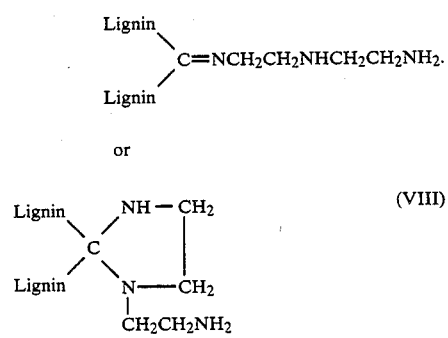

or (VIII)

Lignin containing anhydride structures obtained by the Diels-Alder reaction with maleic anhydride will also yield imidoamine structures (IX).

(IX)

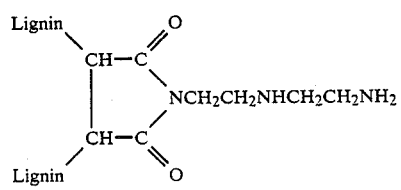

The reaction of lignin with polyamines takes place at 160°–220° C.

The Mannich reaction of lignin with formalamdehyde and DETA can be described as:

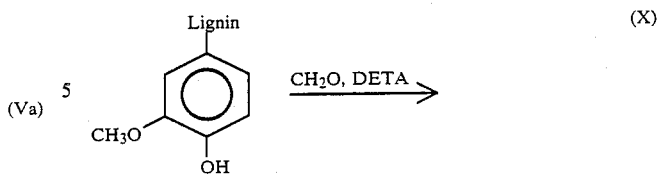
(X)

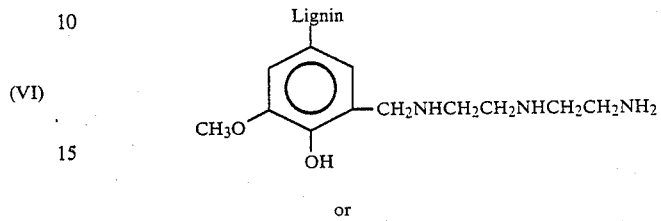

or

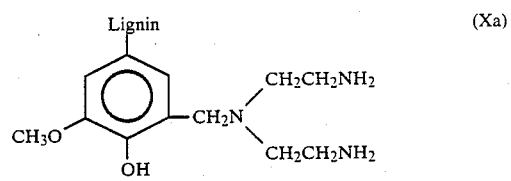
(Xa)

Further crosslinking between lignins is possible when the ratio of formaldehyde to polyamines is increased. This results in higher molecular weight products, such as:

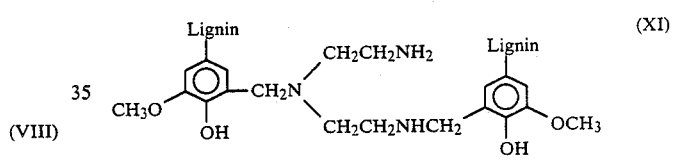
(XI)

The Mannich reaction, carried out under alkaline conditions, takes place between 25° and 100° C.

Tall oil includes a mixture of fatty acids, resin acids (rosin) and unsaponifiable matter. The fatty acids which generally make up 50 to 60% of the tall oil include conjugated and non-conjugated linoleic acid, elaidic and oleic acid. One or more of these fatty acids will generally take part in a reaction sequence according to the present invention, to provide the novel surface active agents.

Oleic and elaidic acids are stereoisomeric $C_{18}$ acids having the following general formula:

$$CH_3(CH_2)_7-CH=CH-(CH_2)_7COOH \quad (XII)$$

The fatty acid is reacted with a polyalkyleneamine to produce a mixture which may contain fatty amidoamines and imidazolines. The reaction of these materials with diethylene triamine is discussed in U.S. Pat. No. 4,658,036.

The oleic acid and elaidic acids will form a mixture of amidoamine (XIIIa) and imidazoline (XIIIb) of the following formulas:

$$CH_3(CH_2)_7CH=CH-(CH_2)_7CONHCH_2NHCH_2CH_2NH_2 \quad (XIIIa)$$

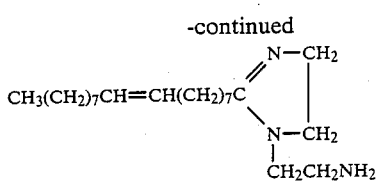
(XIIIb)

It is also possible to react these materials with more complex polyamines such as aminoethyl piperazine. The polyamine reaction product is then reacted with one to two moles of sodium bisulfite formaldehyde to produce the useful surface active agents of the present invention.

In the simplest reaction, the amidoamine (XIIIa) and imidazoline (XIIIb) will react with a bisulfite formaldehyde, typically, an alkali metal, such as sodium or potassium bisulfite formaldehyde, to produce surface active agents having the following formulas:

Industries, Inc. under the trade name "Empol ® Dimer Acids".

The formation of imidoamine-imidazolines and imidazolines is limited to polyethylene amines and polyamines characterized by at least one ethylene diamine functional group with at least three hydrogens attached to the two nitrogens. Compounds of this group which are able to give both amidoamines and imidazolines are ethylene diamine, diethylene triamine, triethylene tetramine, tetraethylene pentamine, pentaethylene hexamine, and higher homologues; aminoethyl ethanolamine, N-aminoethyl propane diamine, N,N'-diaminoethyl propane diamine and the N-aminoethyl or N,N'-diaminoethyl substituted butane diamines, pentane diamines and hexane diamines, and N-hydroxy ethyl ethylene diamine. These compounds have the general formulae:

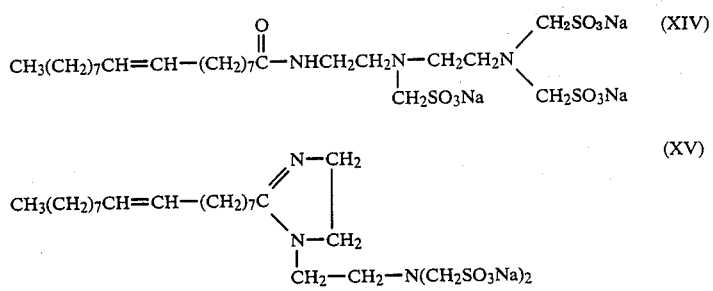

Other possible starting materials include resin acids (rosin), which are mixtures of abietic acid, dihydroabietic acid, and dehydroabietic acid, or rosin reacted with either maleic anhydride or an acid selected from the group consisting of acrylic acid, methacrylic acid, and fumaric acid. By this treatment, a mixture of polycyclic tricarboxylic acids or anhydrides is obtained, such as:

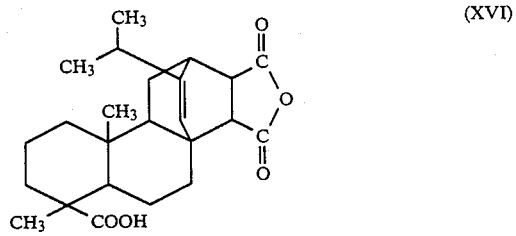
(XVI)

and

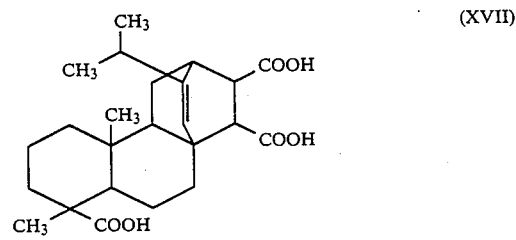
(XVII)

Also, dimer acids, which are long chain $C_{36}$-aliphatic carboxylic acids obtained by dimerization of fatty acids of various sources, may be employed as a starting material for reaction first with a polyamine and, subsequently, with a bisulfite (or sulfite) formaldehyde. An example of this type of acid is produced by Emery $H_2NCH_2CH_2NHR$     (XVIII)

where R = H—, $CH_3$—, $C_2H_5$—, $C_3H_7$—, $CH_2CH_2OH$—, $(CH_2CH_2NH)_xH$ and x = 1, 2, 3, 4, ... 10 or $R_1R_2N(CH_2)_yNHR_3$     (XIX)

$R_1$ = H—, $CH_3$—, $C_2H_5$—, $C_3H_7$—, $NH_2CH_2CH_2$—, $R_2$ = H—, $CH_3$—, $C_2H_5$ $R_3$ = H—, $CH_3$—, $C_2H_5$—, $C_3H_7$—, $NH_2CH_2CH_2$— y = 2, 3, 4, 5, 6.

Amines capable of forming amidoamines but not imidazolines are: 1,3-diaminopropane, 1,4-diaminobutane 1,5-diaminopentane, 1,6-diaminohexane, piperazine (1,4-diazacyclohexane), N-aminoethylpiperazine, N aminopropylpropane diamine-1,3, N-methyl-N-aminopropylpropane diamine-1,3, N,N-dimethylpropane diamine-1,3, N,N-diethyl propane diamine-1,3, N,N-dimethyl-ethylene diamine, N-N-diethyl ethylenediamine; N-aminohexylhexane diamine-1,6. Ether amines such as:

$NH_2CH_2CH_2(OCH_2CH_2)_xNH_2$,     (XX)

where x=1-20, are also capable of forming amidoamines containing oxygen bridges.

Further modifications of the above described mono-, di-, or triamidoamines, imidoamines or imidazolines are the reaction products with reactive oxirane systems such as ethylene oxide, propylene oxide or butylene oxide. Reaction occurs preferentially on primary and secondary nitrogens, that is, a nitrogen to which one or two hydrogen atoms are covalently bound. The reaction products belong to the class of N-hydroxyethyl, N-2-hydroxypropyl- and N-2-hydroxy butyl amidoamines or imidazolines. To obtain intermediates for further modification, the nitrogens with active hydrogens attached should be reacted only partially with these three membered ring-oxides.

The reactions described above take place with varying ratios of acid materials, depending upon the desired composition of the final product. The reaction of the resin acids with acrylic acid, methacrylic acid, fumaric acid or maleic anhydride generally takes place at about 200° to 220° C. for two to four hours. The polyamine reaction generally takes place at about 200 to 265° C. The subsequent sulfomethylation takes place in aqueous solution or mixtures of water and alcohols at from 25° to 100° C. It is an exothermic reaction which is in contrast to the sulfomethylation of amides disclosed in U.S. Pat. No. 3,047,509, where temperatures up to 210° C. are required.

Products according to the invention were prepared according to the following examples.

EXAMPLE 1

Two hundred eighty (280) grams L-5 (commercial mixture of tall oil fatty acids from Westvaco Corporation) is heated with 100 grams DETA, and a temperature of 220° C. is maintained until all the condensate is collected. The reaction product is diluted with an isopropanol-water mixture to 70%, and a concentrated solution of 60 grams formaldehyde and 200 grams sodium bisulfite in water is added.

EXAMPLE 2

One hundred (100) grams kraft lignin is suspended in 400 ml water, and the pH value is adjusted to 10.5 with sodium hydroxide. Thirty (30) grams DETA is added and stirred for 10 minutes, after which 9 grams formaldehyde is added. This mixture is heated to 70° to 90° C. for three hours and allowed to cool to 50° C. A concentrated aqueous solution of 30 grams formaldehyde and 100 grams sodium bisulfite is added and the mixture heated at 50° C. for three hours. The final solids content of the product solution is adjusted to 30%.

EXAMPLE 3

One hundred (100) grams DETA is heated to 100° C., and powdered kraft lignin is slowly added with agitation. The homogeneous mixture is heated to 220° C. and held at that temperature until all the distillate is collected. The reaction product is poured into an aluminum tray, cooled, and pulverized. The product is suspended in water or in a water/ethylene glycol mixture in a respective weight ratio of 5:1. To this suspension, a 300-gram sodium bisulfite and 90-gram formaldehyde solution in water is added with stirring at 50° C. Dilute solution of sodium hydroxide is added dropwise until the solution is homogeneous.

EXAMPLE 4–6

Resin acids and dimer acid were reacted with various acid-polyamines shown in the table below. The acid-polyamine condensate is then reacted with a sodium bisulfide formaldehyde solution to produce a surface active agent. Qualitative determination of solubility in water, dilute HCl, sea water, 10% calcium chloride solution, and 10% magnesium sulfate solution is made by adding about 1 gram of the sulfomethylated product to 100 ml solution.

| Example No. | Acid or Acid Mixtures | Amine | Acid/ Amine w/w | Mole $CH_2O/HSO_3Na$ Per Mole Condensate | Solubility In: Water | Dilute Acid (HCl) | Sea Water | 10% $CaCl_2$ | 10% $MgSO_4$ |
|---|---|---|---|---|---|---|---|---|---|
| 4 | Resin Acids | Polyamine Blend | 2/1 | 1.0 | Turbid | — | — | — | — |
| 5 | Resin Acids | Tetraethylene pentamine | 1/0.6 | 1.0 | + | — | + | Turbid | Turbid |
| 6 | $C_{36}$-Dimer Acid | Diethylene triamine | 2.4/1 | 1.5 | + | — | + | + | + |

General applications proposed for the products of the present invention are as wetting agents, emulsifiers, detergents, corrosion inhibitors, foaming agents, and hydrophobic chelating agents. Possible application areas for the sulfomethylated aminolignins are as dispersants for dyestuffs, cements, gypsum, titanium dioxide, carbon black, etc.; crystal growth modifiers; cement set retardants; chelating agents; sequesterants; emulsion stabilizers, and anti-scalents.

The solubility of a number of the fatty acid derived products in sea water and in $CaCl_2$ solution or $MgSO_4$ solution makes them potentially useful for tertiary oil recovery and drilling muds.

What is claimed is:

1. A method for producing a surface active agent from a by-product of the papermaking process, comprising the steps of:
    (a) reacting a by-product of papermaking selected from the group consisting of lignin, modified lignin, and mixtures thereof, with a polyamine having at least three amine group per molecule, to form an amine condensate; and
    (b) reacting said amine condensate with a bisulfite formaldehyde in aqueous solution to form a surface active agent.

2. The method of claim 1 wherein the polyamine is selected from the group consisting of diethylene triamine, tetraethylene pentamine, and aminoethyl piperazine.

3. The method according to claim 1 wherein the bisulfite formaldehyde is formed from an aqueous solution of formaldehyde and sodium bisulfite or potassium bisulfite.

4. The method of claim 2 wherein the by-product of papermaking is lignin and the polyamine is diethylenetriamine.

5. The method of claim 4 wherein the amine condensate is selected from the group consisting of amidoamine, imine, imidazoline, imidazolidine, and mixtures thereof.

6. The method of claim 5 wherein the amine condensate is selected from the group of amidoamines consisting of Lignin—CONHCH$_2$CH$_2$NHCH$_2$CH$_2$NH$_2$ and

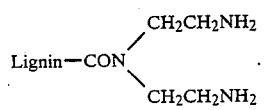

7. The method of claim 5 wherein the amine condensate is the imine

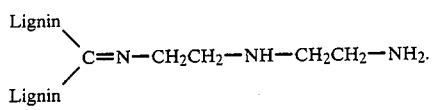

8. The method of claim 5 wherein the amine condensate is an imidazoline of the formula

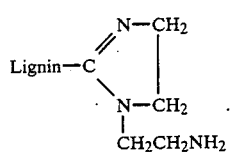

9. The method of claim 5 wherein the amine condensate is an imidazolidine of the formula

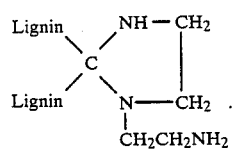

10. The method of claim 1 wherein the by-product of papermaking is modified lignin and the polyamine is selected from the group consisting of diethylenetriamine, tetraethylenepentamine, and aminoethylpiperazine.

11. The method of claim 10 wherein the modified lignin is the Diels-Alder reaction product of lignin and maleic anhydride of the formula

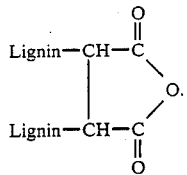

12. The method of claim 11 wherein the polyamine is diethylenetriamine and said amine condensate is an imidoamine of the formula

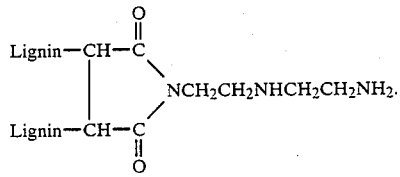

13. The method of claim 10 wherein the amine condensate is a product of a Mannich reaction of lignin with formaldehyde and diethylenetriamine selected from the formulae consisting of

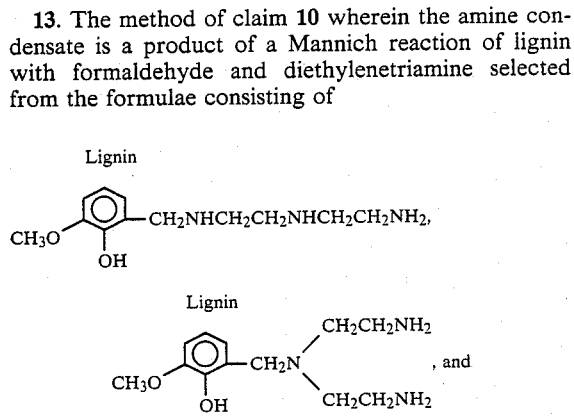

14. The method of claim 1 wherein the polyamine is selected from the group consisting of diethylenetriamine, tetraethylenepentamine, and aminoethylpiperazine.

* * * * *

UNITED STATES PATENT AND TRADEMARK OFFICE
CERTIFICATE OF CORRECTION

PATENT NO. : 4,859,362  
DATED : August 22, 1989  
INVENTOR(S) : Peter Schilling Page 1 of 3

It is certified that error appears in the above-indentified patent and that said Letters Patent is hereby corrected as shown below:

On the cover page, under Related U.S. Application Data, delete "Ser. No. 762,215, Aug. 5, 1985, which is a continuation-in-part of."

On the cover page, under References Cited, delete "Absbury" and substitute therefor --Alsbury--.

On the cover page, under References Cited, after 10/1984, delete "Schiling" and substitute therefor --Schilling--.

In column 1, lines 5 and 6, delete "Ser. No. 762,215, filed on Aug. 5, 1985, which application is a continuation-in-part of application."

In column 3, lines 67 and 68, delete "formalamdehyde" and substitute therefor --formaldehyde--.

In column 4, line 67, in the formula, after $CONHCH_2$, insert --$CH_2$--.

In column 6, line 49, delete "N" and substitute therefor -- N- --.

UNITED STATES PATENT AND TRADEMARK OFFICE
CERTIFICATE OF CORRECTION

PATENT NO. : 4,859,362
DATED : August 22, 1989
INVENTOR(S) : Peter Schilling

It is certified that error appears in the above-indentified patent and that said Letters Patent is hereby corrected as shown below:

In column 8, line 7, delete "EXAMPLE" and substitute therefor --EXAMPLES--.

In Claim 1, column 8, line 56, delete "group" and substitute therefor --group--.

In Claim 13, column 10, delete

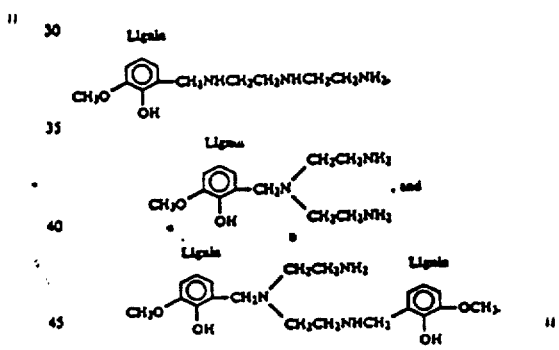

UNITED STATES PATENT AND TRADEMARK OFFICE
CERTIFICATE OF CORRECTION

PATENT NO. : 4,859,362
DATED : August 22, 1989
INVENTOR(S) : Peter Schilling

Page 3 of 3

It is certified that error appears in the above-indentified patent and that said Letters Patent is hereby corrected as shown below:

and substitute --

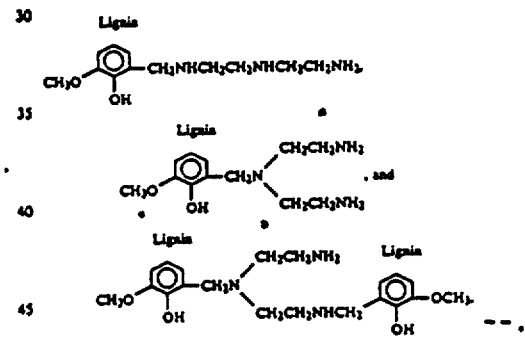

--.

Signed and Sealed this

Twenty-fifth Day of January, 1994

Attest:

BRUCE LEHMAN

Attesting Officer

Commissioner of Patents and Trademarks